United States Patent [19]

Tanaka et al.

[11] Patent Number: 5,220,496
[45] Date of Patent: Jun. 15, 1993

[54] AUTOMATIC ADJUSTING APPARATUS FOR EQUIPMENT

[75] Inventors: Takehisa Tanaka, Tokyo; Motohiko Naka; Mie Saitoh, both of Kawasaki; Toshiki Kindo; Takehiko Shida, both of Yokohama; Kunio Yoshida, Kawasaki, all of Japan

[73] Assignee: Matsushita Electric Industrial Co., Ltd., Osaka, Japan

[21] Appl. No.: 702,472

[22] Filed: May 20, 1991

[30] Foreign Application Priority Data

May 23, 1990 [JP] Japan .................................. 2-133396

[51] Int. Cl.5 .......................................... G06F 15/18
[52] U.S. Cl. .................................. 364/152; 364/148; 364/160; 395/22
[58] Field of Search ........ 364/148, 149, 150, 152–156, 364/160; 395/13, 20–25, 903, 904

[56] References Cited

U.S. PATENT DOCUMENTS

| | | | |
|---|---|---|---|
| 5,019,858 | 5/1991 | Suzuki | 395/22 |
| 5,025,282 | 6/1991 | Nakamura et al. | 395/22 |
| 5,041,916 | 8/1991 | Yoshida et al. | 395/22 |
| 5,109,275 | 4/1992 | Naka et al. | 395/22 |
| 5,126,933 | 6/1992 | White, III | 364/148 |
| 5,142,612 | 8/1992 | Sheirik | 364/148 |

FOREIGN PATENT DOCUMENTS 0204112 12/1986 European Pat. Off. .

OTHER PUBLICATIONS

"An Introduction to Computing with Neural Nets" by Richard P. Lippmann; IEEE ASSP Magazine, Apr. 1987; pp. 4–22.
Proceedings of SPIE, "Applications of Artificial Intelligence VI", Orlando, Fla., Apr. 4–6, 1988, vol. 937, pp. 470–473; S. Chen et al.: Adaptive (neural network) control in computer-integrated-manufacturing.
Proceedings IECON '86, "Industrial Applications of Mini, Micro & Personal Computers" Milwaukee, Wis., Sep. 29–Oct. 3, 1986, vol 1, pp. 164–169; T. Hibara et al.: Automatic adjustment for color display monitor.

*Primary Examiner*—Jerry Smith
*Assistant Examiner*—Thomas E. Brown
*Attorney, Agent, or Firm*—Lowe, Price, LeBlanc & Becker

[57] ABSTRACT

An automatic adjusting apparatus for adjusting equipment which comprises an adjustment state detecting section and a processing section. The detecting section detects an adjustment state of the equipment so as to output one or a plurality of adjustment state indexes on the basis of the detected adjustment state and the processing section performs the process on the basis of the adjustment state index to adjust the equipment. The processing section is equipped with an adjustment state evaluation section for calculating and outputting, on the basis of the adjustment state index, an adjustment evaluation value and an adjustment amount calculation section for calculating, on the basis of the adjustment state index, adjustment amounts for one or a plurality of portions of the equipment. Also included in the processing section is an adjustment control section for selecting, on the basis of the adjustment evaluation value, an adjustment amount from the outputs of the calculation section. The control section controls the calculation section so as to control the adjustment amount on the basis of the selection result. The calculation section has a function to learn the relation between the adjustment state index and the adjustment amount and a function to calculate the adjustment amount in accordance with the learned relation.

2 Claims, 3 Drawing Sheets

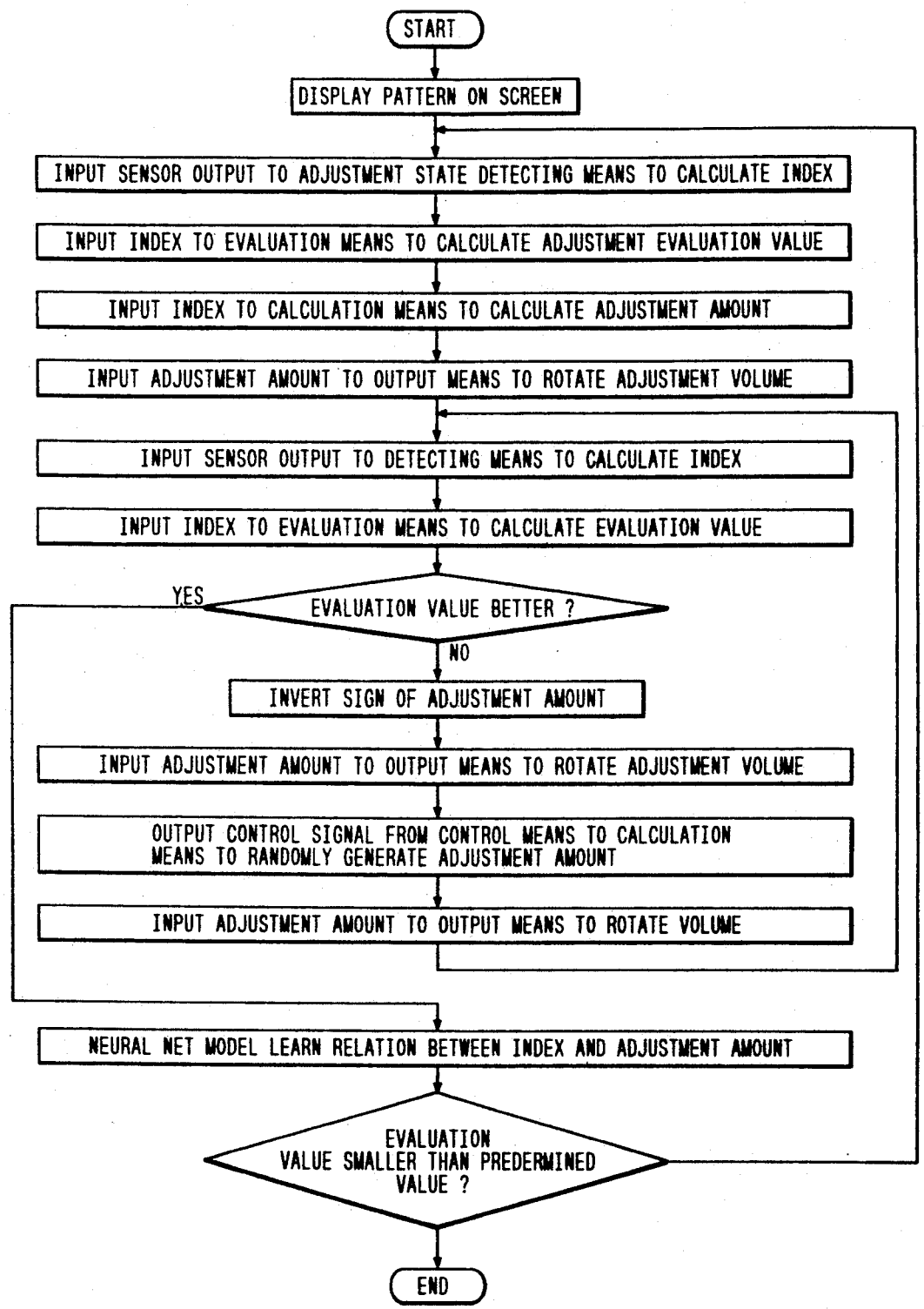

AUTOMATIC ADJUSTING APPARATUS FOR EQUIPMENT

BACKGROUND OF THE INVENTION

The present invention relates to an automatic adjusting apparatus for adjusting equipment at the time of manufacturing or using so that the equipment can normally operate.

Conventionally, the adjustment of a plurality of portions of equipment correlative with each other is principally effected by a person skilled in the adjusting work, while the adjustment is partially and automatically effected. However, the automatic adjusting system is arranged so as to effect the adjustment with the respective adjusting portions being successively and slightly moved or under the condition of being specialized for each equipment. For instance, in manufacturing a television picture tube, the white balance adjusting process for balancing between three colors of red, green and blue is made as follows. That is, a test pattern generator (not shown) displays a bright white (bright portion 51) and a dark gray (dark portion 52) on a cathode ray tube of the television picture tube, as illustrated in FIG. 3, so as to measure the brightnesses of the three colors of red, green and blue at the bright portion 51 and the dark portion 52 by means of a sensor so that a skilled worker adjusts four adjusting volumes to cause the values to be coincident with set values. Moreover, a person successively and slightly operates an adjusting volume by a value set by a program through a device with the brightness of the screen being measured by means of a sensor, thereby automatically performing the adjustment. There is a problem which arises with such a white balance adjustment for the television picture tube, however, in that the worker is required to be highly skilled because the plurality of adjusting portions correlative with each other and the respective adjusting portions greatly have non-linearities. Further, the method of slightly operating the respective volumes through the device has disadvantages that a long time is taken until the adjustment completion and an actually usable adjusting system is required to be controlled in accordance with a complex program made on the basis of the actual adjusting experience.

SUMMARY OF THE INVENTION

The present invention has been developed in order to above-described problems and contemplates to automatically and effectively perform a complex adjusting work such as the white balance adjustment of the television picture tube.

In accordance with the present invention, there is provided an automatic adjusting apparatus comprising: adjustment state detecting means for detecting an adjustment state of equipment to be adjusted so as to output one or a plurality of adjustment state indexes on the basis of the detected adjustment state; adjustment state evaluation means responsive to the adjustment state index from the adjustment state detecting means for calculating and outputting, on the basis of the adjustment state index, an adjustment evaluation value which is an evaluation value of the adjustment state of the equipment to be adjusted; adjustment amount calculation means responsive to the adjustment state index from the adjustment state detecting means for calculating, on the basis of the adjustment state index, adjustment amounts for one or a plurality of portions of the equipment to be adjusted; adjustment control means for selecting, on the basis of the adjustment evaluation value, the adjustment amount which is an output of the adjustment amount calculation means and for controlling the adjustment amount calculation means so as to control the adjustment amount on the basis of the selection result; and adjustment output means for performing the adjustment of said equipment in accordance with the adjustment amount selected by the adjustment control means, wherein the adjustment amount calculation means is equipped with a function to learn the relation between the adjustment state index and the adjustment amount and a function to calculate the adjustment amount of the equipment on the basis of the adjustment state index in accordance with the learned relation between the adjustment state index and the adjustment amount and a function to randomly generate adjustment amounts in the case that difficulty is encountered to adequately calculate the adjustment amount in accordance with the learning, and the adjustment control means selects as a final adjustment amount of the equipment one of the randomly generated adjustment amounts whereby the adjustment evaluation value becomes close to a predetermined value and further the adjustment control means controls the adjustment amount calculation means so that the adjustment amount calculation means effects the learning on the basis of only the final adjustment amount.

Preferably, the adjustment amount calculation means includes neural network means having the learning function, random number generating means for randomly generating the adjustment amounts and learning control means for controlling the neural network means and the random number generating means in accordance with a control signal from the adjustment control means.

BRIEF DESCRIPTION OF THE DRAWINGS

The object and features of the present invention will become more readily apparent from the following detailed description of the preferred embodiments taken in conjunction with the accompanying drawings in which:

FIG. 4 is a flow chart showing the operation to be executed by the FIG. 1 automatic adjusting apparatus.

DETAILED DESCRIPTION OF THE INVENTION

Figure 1:
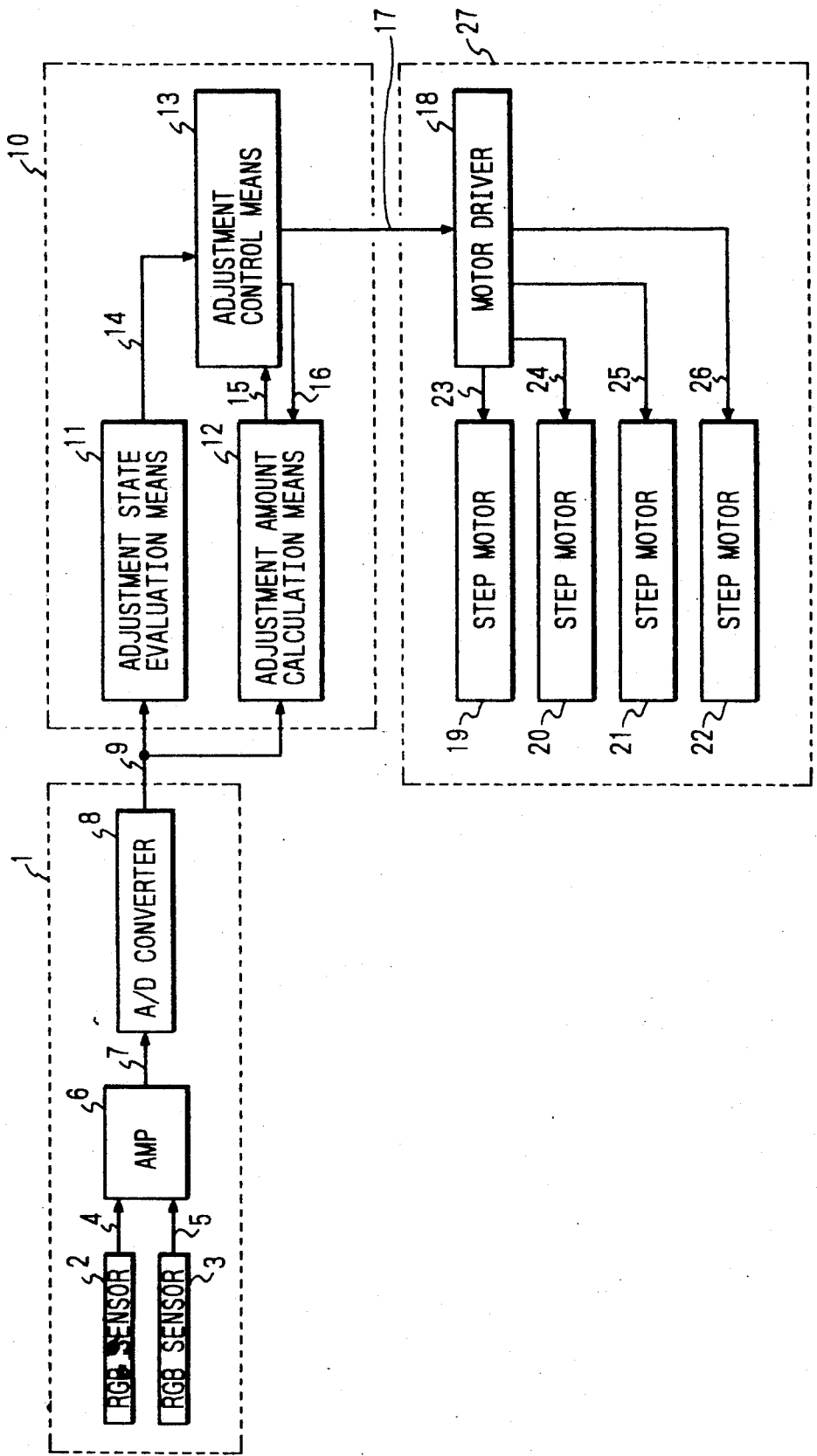
FIG. 1 is a block diagram showing an arrangement of an automatic adjusting apparatus according to an embodiment of the present invention.
Figure 3:
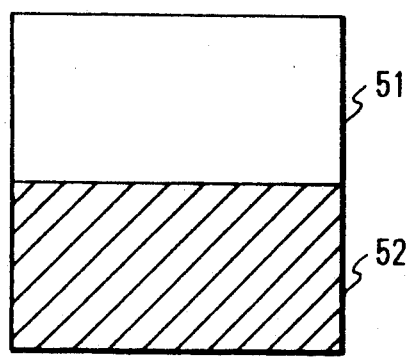
FIG. 3 is an illustration of a pattern on a screen of a television picture tube.

Referring nore to FIG. 1, there is illustrated an automatic adjusting apparatus according to an embodiment of the present invention. Here, the automatic adjusting apparatus of this embodiment is employed for the white balance adjustment of a television picture tube. In FIG. 1, illustrated at numeral 1 is an adjustment state detecting means which is composed of RGB sensors 2, 3, an amplifier 6 and an analog-to-digital (A/D) converter 7. The RGB sensor 2 is arranged to measure the brightnesses of red (R), green (G) and blue (B) of a bright portion 51 of a pattern as illustrated in FIG. 3 which is displayed on a cathode ray tube of the television picture tube to be adjusted, thereby outputting a luminance signal 4 to the amplifier 6. Further, the RGB sensor 3 is similarly arranged to measure the brightnesses of R, G and B of a dark portion 52 of the pattern as illustrated in FIG. 3 so as to output a luminance signal 5 to the amplifier 6. The amplifier 6 amplifies the respective luminance signals 4 and 5 so as to output a luminance signal 7 to the A/D converter 8. The A/D converter 8 converts the luminance signal 7 into a digital form so as to output as an adjustment state index 9 the digital luminance values of the red, green and blue of the bright portion 51 and dark portion 52 to an adjustment state evaluation means 11 and further to an adjustment amount calculation means 12. The adjustment state evaluation means 11, the adjustment amount calculation means 12 and an adjustment control means 13 (which will hereinafter be described in detail) can be realized by a program to be executed by a microcomputer illustrated at numeral 10. Here, let it be assumed that the luminance values of R, G and B of the bright portion 51 and dark portion 52 of the adjustment state index 9 are taken as $I_i$ (i=1 to 6) and the reference luminance values of R, G and B of the bright portion 51 and dark portion 52 which are set as reference values for white color are taken as $D_i$ (i=1 to 6).

The adjustment state evaluation means 11 calculates each of $(D_i - I_i)^2$ and further calculates the total sum of the calculation results which is in turn outputted as an adjustment evaluation value 14 to the adjustment control means 13. The adjustment evaluation value 14 is always a positive value and the adjustment state is more desirable as the adjustment evaluation value 14 is smaller. Here, an adjustment evaluation value is predetermined whereby the work for the adjustment is completed when the adjustment evaluation value 14 becomes below the predetermined adjustment evaluation value. The adjustment amount calculation means 12 learns the relation between the adjustment state index 9 and the adjustment amount in accordance with a control signal from the adjustment control means 13 so as to calculate an adjustment amount 15 on the basis of the adjustment state index 9 in accordance with the relation. Furthermore, if the value of the adjustment amount 15 based on the learning is inadequate, the adjustment amount calculation means 12 randomly generates an adjustment amount 15 in accordance with the control signal 16 from the adjustment control means 13. Here, the adjustment amount 15 takes four real vectors corresponding to four adjusting volumes of the television picture tube, and the adjustment amount 15 to be randomly generated is normalized so that the absolute value of the vector becomes constant.

Figure 2:
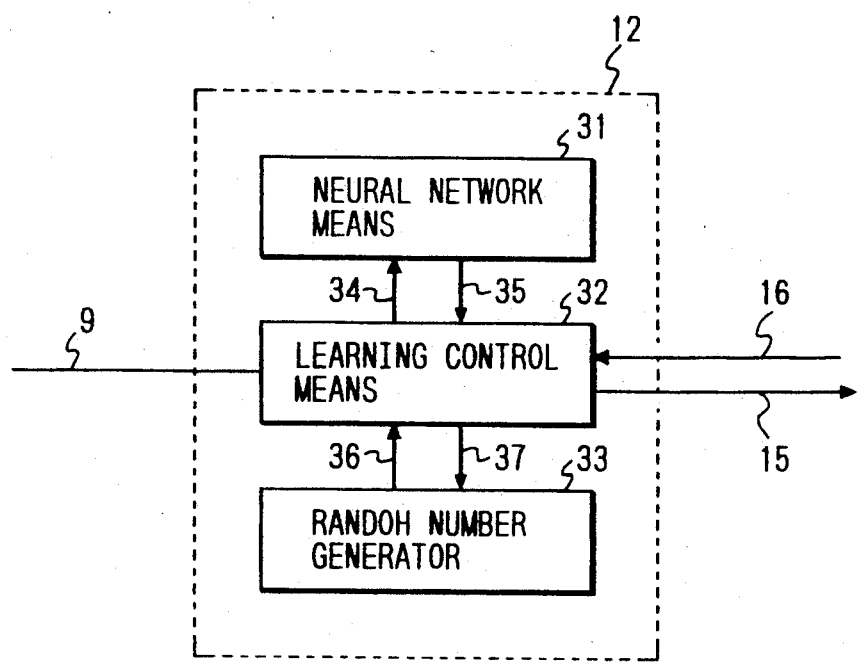
FIG. 2 is a block diagram showing an arrangement of an adjustment amount calculation means to be used in the FIG. 1 automatic adjusting apparatus.

Secondly a description will be made hereinbelow with reference to FIG. 2 in terms of the adjustment amount calculation means 12. In FIG. 2, a neural network means 31 is responsive to a control signal 34 from a learning control means 32, which includes the adjustment state index 9, so as to calculate an adjustment amount 35 with respect to the adjustment state index 9 to output the calculated adjustment amount 35 to the learning control means 32. In addition, the neural network means 31 learns the relation between the adjustment state index 9 and the adjustment amount corresponding to the adjustment state index 9. Here, the neural network means 31 can comprise a combination of an error back-propagation learning and a three-layer perceptron where the input layer whose units are 6 adjustment indexes 9, the output layer whose units are 4 adjusting portions and the imbedded layer is one layer whose unit number is 8. The hierarchical type perceptron and the error back-propagation learning are disclosed in detail in "Neural Network Information Process" 1988 written by Hideki Aso and published by Sangyo Tosho Co., Ltd., for example.

In response to a control signal 37 from the learning control means 32, a random number generator 33 randomly generates the adjustment amount 36 which is in turn supplied to the learning control means 32. Each of the adjustment amounts 35 and 36 is a four-dimensional vector comprising four real numbers. The learning control means 32 is responsive to the adjustment state index 9 from the adjustment state detecting means 1 so as to causes the neural network means 31 or the random number generator 36 to calculate the adjustment amount at that time, the calculated adjustment amount being inputted as the adjustment amount 35 or 36 therefrom to the learning control means 32. Further, the absolute value (norm) of the adjustment amount (vector amount) is normalized to become constant so as to be outputted as the adjustment amount 15. Still further, in accordance with the control signal 16, the neural network means 31 learns the relation between the adjustment state index 9 and the adjustment amount 15.

Returning back to FIG. 1, the adjustment control means 13 selects the adjustment amount 15 of the adjustment amount calculation means 12 in accordance with the adjustment evaluation value 14 so that the adjustment evaluation value 14 becomes smaller. That is, the control signal 16 is outputted to the adjustment amount calculation means 12 and an adjustment amount 17 is outputted to an adjustment output means 27 so that the adjustment amount for causing the adjustment evaluation value 14 to become smaller is used for the adjustment. The adjustment output means 27 is composed of a motor driver 18 and step motors 19 to 22. The motor driver 18 receives the adjustment amounts 17 of the adjusting volumes for four adjusting portions of the television picture tube from the adjustment control means 13 and outputs pulses 23 to 26 to the step motors 19 to 22 corresponding to the respective adjusting portions so that the step motors 19 to 22 are rotated by angles respectively corresponding to the adjustment amounts 17. The rotating shafts (not shown) of the step motors 19 to 22 respectively have driver-like configurations which can be inserted into the adjusting volumes (not shown) for the four adjusting portions of the television picture tube.

The operation of the FIG. 1 automatic adjusting apparatus will be described hereinbelow with reference to a flow chart of FIG. 4. First, the screen of the television picture tube to be adjusted is arranged to display a pattern as illustrated in FIG. 3, whereupon the sensors 2 and 3 are arranged to be in confronting relation to the cathode ray tube of the television picture tube and the shafts of the step motors 19 to 22 are inserted into the adjusting volumes of the television picture tube. Thereafter, the white balance adjusting operation is executed as follows:

1) the sensors 2 and 3 respectively measure the brightnesses of R, G and B at the bright portion 51 and dark portion 52 (see FIG. 3) on the screen of the television picture tube and the measurement results are amplified by the amplifier 6 and then A/D-converted from the analog signals into digital signals so as to obtain an adjustment state index 9;

2) the adjustment state index 9 is inputted to the adjustment state evaluation means 11 so as to calculate an adjustment evaluation value 14 at that time, and the adjustment amount calculation means 12 calculates the adjustment amounts 35 for the four adjusting portions of the television picture tube on the basis of the adjustment evaluation value 14 using the neural network means 31 and further calculates the adjustment amount 15 to be outputted, and the adjustment control means 13 directly outputs to the adjustment output means 27 the adjustment amount 15 outputted from the adjustment amount calculation means 12 so that adjustment output means 27 rotates the adjusting volumes for the four adjusting portions of the television picture tube;

3) after the adjustment, the adjustment state detecting means 1 measures the adjustment state index 9 from the screen of the television picture tube and the adjustment state evaluation means 11 further calculates the adjustment evaluation value 14 so that the present adjustment evaluation value 14 is compared with the previously measured adjustment evaluation value 14 and, if the present adjustment evaluation value 14 is smaller than the previous evaluation value 14, that is, when the adjustment state is directed to become better, the operation will advances to a step 7 which will be described hereinafter;

4) if the previously measured adjustment evaluation value 14 is smaller than the present adjustment evaluation value 14, that is, when the adjustment state is directed to become deteriorated, with the signs of the respective elements of the adjustment amount 17 previously outputted from the adjustment control means 13 to the adjustment output means 27 being inverted, the adjustment control means 13 again outputs the adjustment amount 17 so that the adjusting volumes for the four adjusting portions of the television picture tube are respectively rotated so as to cancel the previous adjustment;

5) the adjustment control means 13 outputs the control signal 16 to the adjustment amount calculation means 12 to cause the random number generator 33 to randomly generate the adjustment amounts 36 for the four adjusting portions of the television picture tube and cause the adjustment amount 15 to be calculated and then outputted from the adjustment amount calculation means 12, and further the adjustment 15 is outputted as the adjustment amount 17 from the adjustment control means 13 to the adjustment output means 27 so as to adjust the adjusting volumes for the four portions of the television picture tube;

6) The operational flow again proceeds to the above-described 3); and 7) the adjustment control means 13 outputs the control signal 16 to the adjustment amount calculation means 12 so that the neural network means 31 of the adjustment amount calculation means 12 learns the relation between the final adjustment amount and the adjustment state index 9.

This adjustment operation is repeatedly performed until the adjustment evaluation value 14 becomes smaller than a predetermined value and completed when it becomes smaller than the predetermined value. If the above-described adjustment operation is repeatedly effected for a number of television picture tubes, the neural network means 31 of the adjustment amount calculation means 12 gradually learns the relation of the adjustment amount 35 with respect to the adjustment state index 9, thereby cancelling the requirement to randomly generate the adjustment amount 37 so as to automatically and effectively perform the white balance adjustment of the television picture tube.

Although in the above-described embodiment the neural network means 31 is constructed by a multi-layer perceptron, it is appropriate to use a vector quantization learning or the like. Further, although the neural network means 31 is used as the learning means of the adjustment amount calculation means, it is appropriate to use a system such as a statistical process and a polynomial approximation. Still further, although one adjustment amount is learned with respect to one adjustment state index, it is also appropriate that a plurality of adjustment amounts are learned with respect to one adjustment index. In this case, the use of the adjustment amount of the random number generator is made after all the adjustment amounts learned with respect to one adjustment state index are used. Moreover, although the adjustment state evaluation means, adjustment amount calculation means and adjustment control means are constructed by a program to be executed by a microcomputer, it is also appropriate to effect them by using a special LSI. In addition, although the automatic adjusting apparatus is employed for the white balance adjustment of the television picture tube, it is possible to use it for the other adjustments. Further, although the automatic adjusting apparatus is used independently from the equipment to be adjusted, it is also appropriate to incorporate it into the equipment to be adjusted.

According to the above-described embodiment, it is not required to use a skilled worker because the automatic adjusting apparatus automatically performs the adjustment. Further, since the adjustment amounts are randomly generated at the time of being non-learned and only a desirable adjustment amount is used, it is not required to designate the adjustment amount corresponding to the adjustment state through a program made by a person, thereby easily using the automatic adjusting apparatus for various kinds of adjustments. In addition, since the adjustment amounts are learned with respect to various adjusting states, it is possible to perform the adjustment so as to be suitable for the adjustment state, thereby shortening the adjusting time period to effectively effecting the adjustment.

It should be understood that the foregoing relates to only a preferred embodiment of the present invention, and that it is intended to cover all changes and modifications of the embodiment of the invention herein used for the purposes of the disclosure, which do not constitute departures from the spirit and scope of the invention.

What is claimed is:

1. An automatic adjusting apparatus comprising:

adjustment state detecting means for detecting an adjustment state of equipment to be adjusted so as to output one or a plurality of adjustment state indexes on the basis of the detected adjustment state;

adjustment state evaluation means responsive to said adjustment state index from said adjustment state detecting means for calculating and outputting, on the basis of said adjustment state index, an adjustment evaluation value which is an evaluation value of the adjustment state of said equipment to be adjusted;

adjustment amount calculation means responsive to said adjustment state index from said adjustment state detecting means for calculating, on the basis of said adjustment state index, adjustment amounts for one or a plurality of portions of said equipment to be adjusted;

adjustment control means for selecting, on the basis of said adjustment evaluation value, the adjustment amount which is an output of said adjustment amount calculation means and for controlling said adjustment amount calculation means so as to control the adjustment amount on the basis of the selection result; and adjustment output means for performing the adjustment of said equipment in accordance with the adjustment amount selected by said adjustment control means, wherein said adjustment amount calculation means is equipped with a function to learn the relation between said adjustment state index and the adjustment amount and a function to calculate the adjustment amount of said equipment on the basis of said adjustment state index in accordance with the learned relation between said adjustment state index and the adjustment amount and a function to randomly generate adjustment amounts in the case that difficulty is encountered to adequately calculate the adjustment amount in accordance with the learning, and said adjustment control means selects as a final adjustment amount of said equipment one of the randomly generated adjustment amounts whereby said adjustment evaluation value becomes close to a predetermined value and further said adjustment control means controls said adjustment amount calculation means so that said adjustment amount calculation means effects the learning on the basis of only the final adjustment amount.

2. An automatic adjusting apparatus as claimed in claim 1, wherein said adjustment amount calculation means includes neural network means having the learning function, random number generating means for randomly generating the adjustment amounts and learning control means for controlling said neural net model means and said random number generating means in accordance with a control signal from said adjustment control means.

* * * * *